United States Patent
Laughlin et al.

(10) Patent No.: US 8,902,254 B1
(45) Date of Patent: *Dec. 2, 2014

(54) PORTABLE AUGMENTED REALITY

(75) Inventors: Brian Dale Laughlin, Wichita, KS (US); Richard Eugene Murrish, Wichita, KS (US); John Costello, Derby, KS (US); Jan H. Vandenbrande, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/874,586

(22) Filed: Sep. 2, 2010

(51) Int. Cl.
*G06T 19/00* (2011.01)

(52) U.S. Cl.
USPC .......................................................... 345/633

(58) Field of Classification Search
CPC .................................................... G06T 19/006
See application file for complete search history.

(56) References Cited

U.S. PATENT DOCUMENTS

| | | | |
|---|---|---|---|
| 6,166,744 | A | 12/2000 | Jaszlics et al. |
| 2002/0010734 | A1 | 1/2002 | Ebersole et al. |
| 2004/0189675 | A1 | 9/2004 | Pretlove et al. |
| 2005/0128197 | A1* | 6/2005 | Thrun et al. ............... 345/421 |
| 2007/0127015 | A1* | 6/2007 | Palmateer et al. ......... 356/237.1 |
| 2007/0229498 | A1* | 10/2007 | Matusik et al. ............. 345/420 |
| 2007/0242131 | A1* | 10/2007 | Sanz-Pastor et al. ...... 348/14.02 |
| 2007/0273610 | A1* | 11/2007 | Baillot ........................... 345/8 |
| 2008/0030575 | A1 | 2/2008 | Davies et al. |
| 2009/0245512 | A1 | 10/2009 | Masui et al. |
| 2009/0257589 | A1 | 10/2009 | Yokota et al. |
| 2009/0322671 | A1* | 12/2009 | Scott et al. .................. 345/156 |
| 2010/0149323 | A1* | 6/2010 | Yoo et al. ...................... 348/66 |
| 2010/0168891 | A1* | 7/2010 | Kretsis ........................... 700/98 |
| 2010/0257252 | A1* | 10/2010 | Dougherty et al. ........... 709/217 |
| 2011/0102460 | A1* | 5/2011 | Parker ........................... 345/633 |
| 2011/0134108 | A1* | 6/2011 | Hertenstein ................... 345/419 |
| 2011/0216089 | A1* | 9/2011 | Leung ........................... 345/633 |
| 2011/0287811 | A1* | 11/2011 | Mattila et al. ................. 455/566 |

FOREIGN PATENT DOCUMENTS

| | | |
|---|---|---|
| DE | 102006033064 A1 | 2/2007 |
| WO | 0225319 A2 | 3/2002 |

OTHER PUBLICATIONS

Azuma, "Overview of Augmented Reality," 2004, ACM, SIGGRAPH 2004 Course Notes, p. 1-10.*
Haritos et al., "A Mobile Application of Augmented Reality for Aerospace Maintenance Training," 2005, Digital Avionics Systems Conference 2005, vol. 1.*
PCT search report dated Dec. 15, 2011 regarding application PCT/US2011/052636, filed Sep. 21, 2011, applicant The Boeing Company, 10 Pages.
Related U.S. Appl. No. 13/005,753, filed Jan. 13, 2011, 65 Pages.
"What is Photosynth?", Microsoft Photosynth, retrieved Aug. 24, 2010, p. 1. http://photosynth.net/about.aspx.
"PolyWorks", InnovMetric Software, retrieved Aug. 24, 2010, p. 1. innovmetric.com/.../so_pointcloud.aspx . . . .

(Continued)

*Primary Examiner* — Kee M Tung
*Assistant Examiner* — Ryan D McCulley
(74) *Attorney, Agent, or Firm* — Yee & Associates, P.C.

(57) ABSTRACT

The different advantageous embodiments provide a system comprising a processor unit, a sensor system, and a user interface. The processor unit is configured to execute a data manipulation process. The sensor system is configured to retrieve physical data about a number of physical objects. The user interface has data manipulation controls for the data manipulation process.

15 Claims, 10 Drawing Sheets

(56) References Cited

OTHER PUBLICATIONS

"Mental Images: RealityServer Platform", retrieved Aug. 24, 2010, pp. 1-2. mentalimages.com/.../realityserver.html.

"NVIDIA Tesla Personal Supercomputer", retrieved Aug. 24, 2010, pp. 1-2. nvidia.com/.../personal_supercomputin . . . .

International Preliminary Report on Patentability, dated Jul. 16, 2013, regarding Application No. PCT/US2011/052636, 6 pages.

Office Action, dated Oct. 29, 2013, regarding U.S. Appl. No. 13/005,753, 35 pages.

Final Office Action, dated Jan. 29, 2014, regarding U.S. Appl. No. 13/005,753, 21 pages.

* cited by examiner

PORTABLE AUGMENTED REALITY

BACKGROUND INFORMATION

1. Field

The present disclosure relates generally to a data processing system and more particularly to a system for augmenting reality. Still more particularly, the present disclosure relates to methods and systems for combining physical and digital data to create an augmented reality.

2. Background

Traditional methods of evaluating damage and developing potential repair scenarios in a production environment are currently based on two dimensional documentation and generalized procedures dictated by the drawing based environment being used in the design process. This requires a user to have the two dimensional documents on hand, along with supplemental reference information, in order to be able to correctly identify the location at which a repair must be made, as well as to ascertain what the maintenance and repair history is relative to the operations that need to take place.

Composite structures tend to be harder to find a specific physical repair on, and the repairs are more critical, due to the integrated nature of composite structures.

Therefore, it would be advantageous to have a method and apparatus that addresses one or more of the issues discussed above.

SUMMARY

The different advantageous embodiments provide an apparatus comprising a processor unit, a sensor system, and a user interface. The processor unit is configured to execute a data manipulation process. The sensor system is configured to retrieve physical data about a number of physical objects. The user interface has data manipulation controls for the data manipulation process.

The different advantageous embodiments further provide an apparatus comprising a computer system configured to receive physical data generated by a number of portable devices, align the physical data to digital data, and generate a multi-dimensional representation of the physical data and the digital data.

The different advantageous embodiments further provide a method for augmenting reality. Physical data is captured at a point of use using a number of portable devices. The physical data is transmitted to a processor unit remote from the number of portable devices for alignment and integration. A multi-dimensional representation is transmitted to the number of portable devices.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
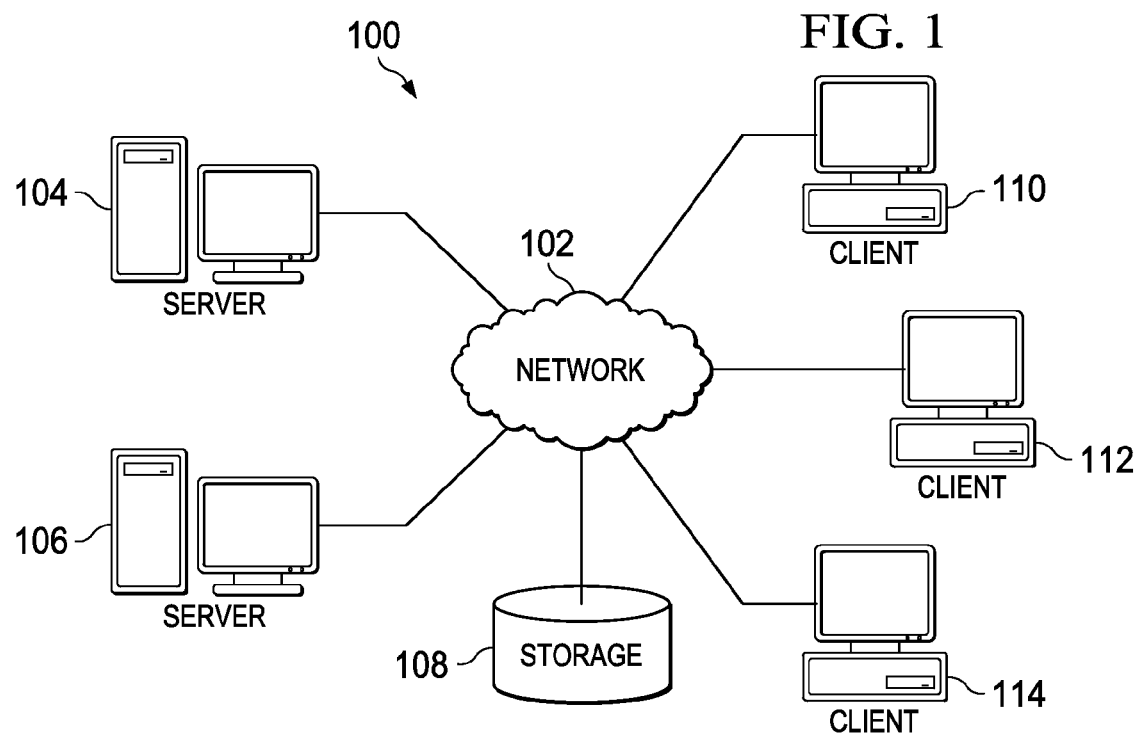
FIG. 1 is an illustration of a network of data processing systems in which an advantageous embodiment may be implemented.
Figure 2:
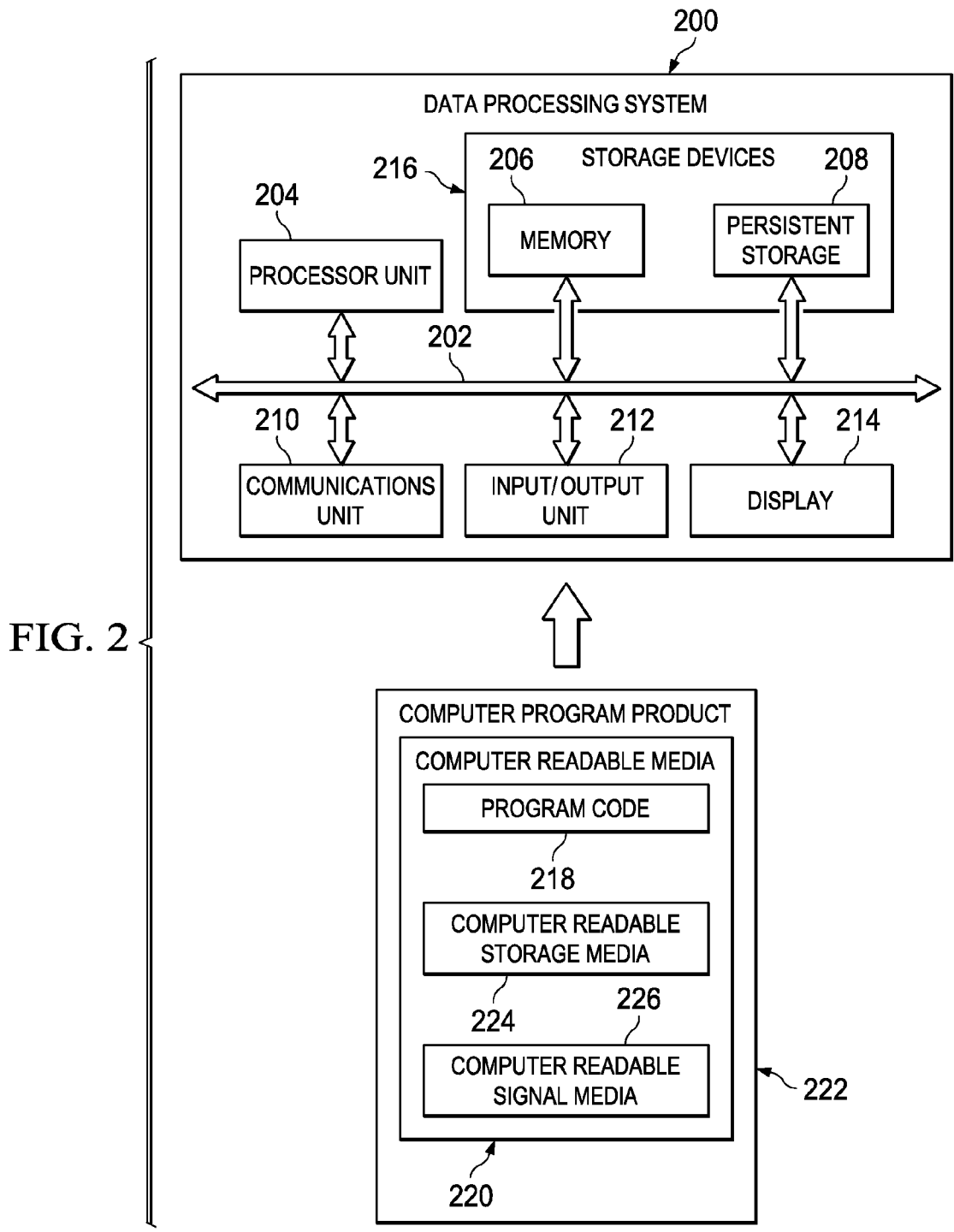
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures and in particular with reference to FIG. 1, an illustrative diagram of a data processing environment is provided in which advantageous embodiments may be implemented. It should be appreciated that FIG. 1 are only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which advantageous embodiments may be implemented. Network data processing system 100 is a network of computers in which the advantageous embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers, handheld computers, portable computers, or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use a communications protocol, such as the Transmission Control Protocol/Internet Protocol (TCP/IP) suite of protocols for example, to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different advantageous embodiments.

Turning now to FIG. 2, a block diagram of a data processing system is depicted in accordance with an advantageous embodiment. Data processing system 200 is an example of a data processing system that may be used to implement servers and clients, such as server 104 and client 110 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current computing environments include software modules that are not integrated in such a way as to overlap digital data with physical data and handheld devices that are not powerful enough to generate the environment required for the point of use augmented reality experience desired. Upfront preparation, limited portability, high costs, and set-up delays plague current capabilities and prevent a cost-effective, accessible and ad-hoc implementation of a persistent augmented reality.

Thus, the different advantageous embodiments provide a system comprising a processor unit, a sensor system, and a user interface. The processor unit is configured to execute a data manipulation process. The sensor system is configured to retrieve physical data about a number of physical objects. The user interface has data manipulation controls for the data manipulation process.

The different advantageous embodiments further provide an apparatus comprising a computer system configured to receive physical data generated by a number of portable devices, align the physical data to digital data, and generate a multi-dimensional representation of the physical data and the digital data.

The different advantageous embodiments further provide a method for augmenting reality. Physical data is captured at a point of use using a number of portable devices. The physical data is transmitted to a processor unit remote from the number of portable devices for alignment and integration. A multi-dimensional representation is transmitted to the number of portable devices.

Figure 3:
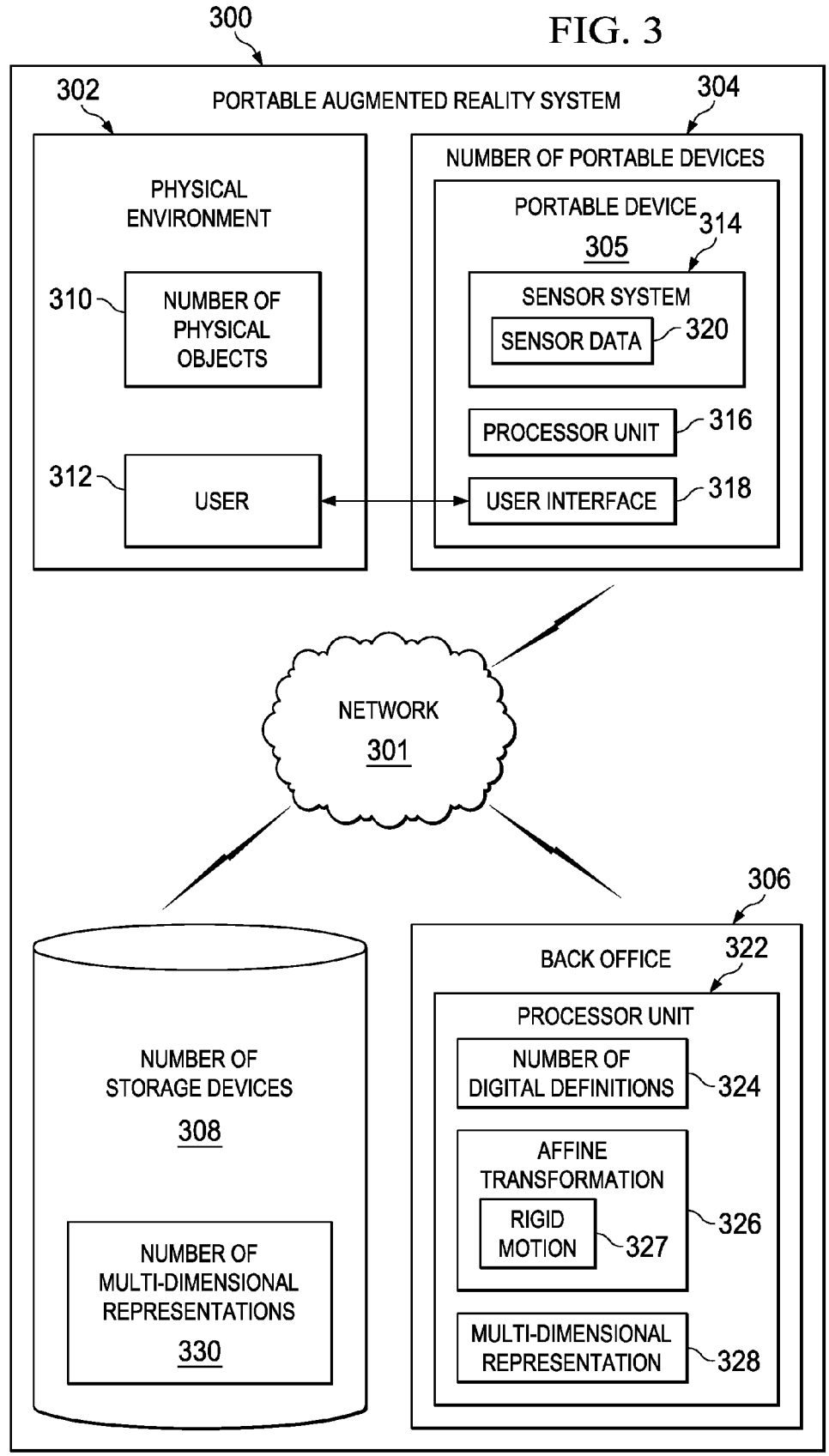
FIG. 3 is an illustration of a portable augmented reality system in accordance with an advantageous embodiment.

With reference now to FIG. 3, an illustration of a portable augmented reality system is depicted in accordance with an advantageous embodiment. Portable augmented reality system 300 may be implemented in a network environment, such as network data processing system 100 in FIG. 1, for example.

Augmented reality refers to digital information overlaid on the physical world. Portable augmented reality system 300 includes physical environment 302, number of portable devices 304, back office 306, and number of storage devices 308. Physical environment 302 is any type of environment in the physical world. Physical environment 302 may be, for example, without limitation, a maintenance environment, a manufacturing environment, a production environment, a design environment, a medical environment and/or any other suitable environment.

Physical environment 302 includes number of physical objects 310. Number of physical objects 310 is one or more physical objects within physical environment 302. Number of physical objects 310 may be, for example, without limitation, aircraft, systems, electronics, parts, tools, wiring, components, architectural components, biological components, veterinary/medical components, and/or any other suitable physical object. Physical environment 302 may also include user 312. User 312 may operate within physical environment 302 and interact with number of physical objects 310, for example.

Portable device 305 is an illustrative example of number of portable devices 304. Number of portable devices 304 is any type of hardware device configured to capture physical data and receive a compilation of physical and digital data to display to user 312 using a user interface. Number of portable devices 304 is configured to be moved or handled by a user, such as user 312, for example. Number of portable devices 304 may be, for example, without limitation, a handheld device, a smart phone, a laptop, and/or any other suitable portable device. Portable device 305 includes sensor system 314, processor unit 316, and user interface 318.

Sensor system 314 captures sensor data 320 about number of physical objects 310. Sensor data 320 is information about physical data in physical environment 302, such as number of physical objects 310. Processor unit 316 is an illustrative example of one implementation of processor unit 204 in FIG. 2. User interface 318 may be a number of hardware devices configured to give user 312 access to data using portable device 305. User interface 318 may include a display and a number of peripheral devices, such as a keyboard, mouse, touchpad, or trackball, for example. User interface 318 may include an interactive touchscreen in one illustrative example.

Sensor system 314 captures sensor data 320 about number of physical objects 310 and transmits sensor data 320 to back office 306 using network 301. Back office 306 may be a location remote from number of portable devices 304, for example. Back office 306 includes processor unit 322. Processor unit 322 is an illustrative example of one implementation of processor unit 204 in FIG. 2.

Processor unit 322 receives sensor data 320 from number of portable devices 304 and generates number of digital definitions 324 using sensor data 320. Number of digital definitions 324 may be one or more derived geometries of a quality sufficient to align with a digital definition of a physical object, such as number of physical objects 310. Processor unit 322 uses number of digital definitions 324 to generate affine transformation 326.

An affine transformation between two vector spaces is a linear transformation followed by a translation. Affine transformation 326 may include rigid motion 327. Rigid motion 327 is a representation of a solid body of finite size without deformation. The distance between any two given points of a rigid body remain constant regardless of external forces exerted on the rigid body, for example. In other words, rigid motion does not allow for scaling or skewing of the representation. Rigid motion 327 may be, for example, without limitation, a 3×3 rotation matrix for a three-dimensional geometry, a 4×4 matrix using homogeneous coordinates that encapsulates both a rotation and translation into a single representation, a translation vector and Euler angles, a screw motion, and/or any other suitable rigid motion. Affine transformation 326 includes rigid motion 327, and may also allow for scaling and skewing of a representation, in some advantageous embodiments.

Affine transformation 326 may be a mapping or overlay of other physical and digital data to the digital definition of a physical object captured by number of portable devices 304. As an illustrative example, affine transformation 326 may be time-stamped photos of physical objects overlaid with underlying structural or historical repair data. Processor unit 322 generates multi-dimensional representation 328 using affine transformation 326, and transmits multi-dimensional representation 328 to number of portable devices 304. A multi-dimensional representation is a representation of three or more dimensions, in these examples.

Processor unit 316 of portable device 305 may receive multi-dimensional representation 328 and provide user 312 with a number of image manipulation controls to view the information in a number of different ways. In one illustrative example, multi-dimensional representation 328 may be streamed down to number of portable devices 304.

Multi-dimensional representation 328 may also be stored in number of storage devices 308 for later reference and review. Number of multi-dimensional representations 330 may represent stored results of augmented realities processed using portable augmented reality system 300, for example.

The illustration of portable augmented reality system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
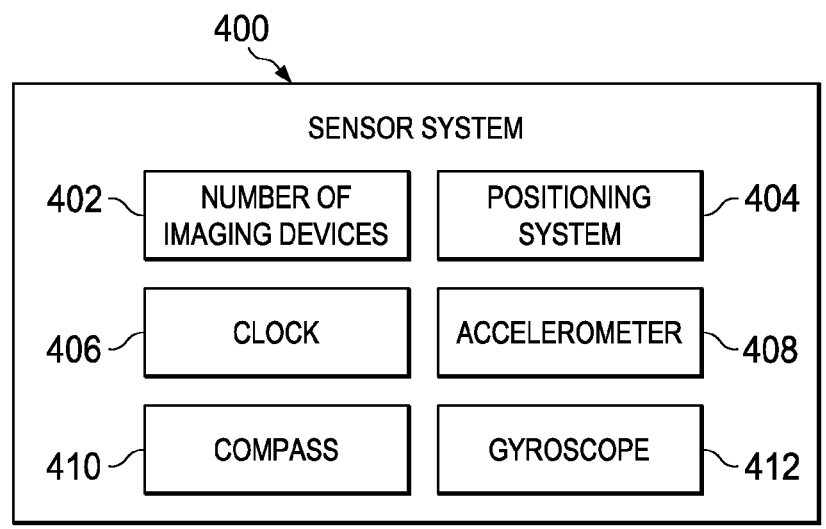
FIG. 4 is an illustration of a sensor system in accordance with an advantageous embodiment.

With reference now to FIG. 4, an illustration of a sensor system is depicted in accordance with an advantageous embodiment. Sensor system 400 is an illustrative example of one implementation of sensor system 314 in FIG. 3.

Sensor system 400 may include, without limitation, number of imaging devices 402, positioning system 404, clock 406, accelerometer 408, gyroscope 412 and compass 410. Number of imaging devices 402 may be any type of device used to capture images of physical objects and environments. Number of imaging devices may include, for example, without limitation black and white cameras, color cameras, thermal imaging cameras, video cameras, and/or any other suitable imaging device.

Positioning system 404 may be any type of positioning system that provides a spatial context for images captured by sensor system 400. A spatial context refers to the geographic location of where an image was taken and the orientation of the image taken, as well as possible distance from physical objects in the environment. In one illustrative example, the positioning system may be a radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from obstacles. In another illustrative example, the positioning system may be a local positioning system or a system based on acoustic or infrared technologies, for example.

Clock 406 may be any suitable time keeping device configured to provide a date and time stamp for sensor data collected by sensor system 400.

Accelerometer 408 is a device configured to detect acceleration relative to free fall. Accelerometer 408 may be used to sense orientation, acceleration of a portable device, vibration shocks, falling, and/or any other suitable movement.

Compass 410 is a device configured to determine direction relative to the Earth's magnetic poles. Compass 410 may be used to determine orientation and direction of an image captured by sensor system 400, for example.

Gyroscope 412 is a device for measuring orientation, such as the orientation of a portable device having sensor system 400, for example. Gyroscope 412 may be used to sense orientation of a portable device, as well as pitch, roll, and yaw attitude angles of a portable device, for example.

The illustration of sensor system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
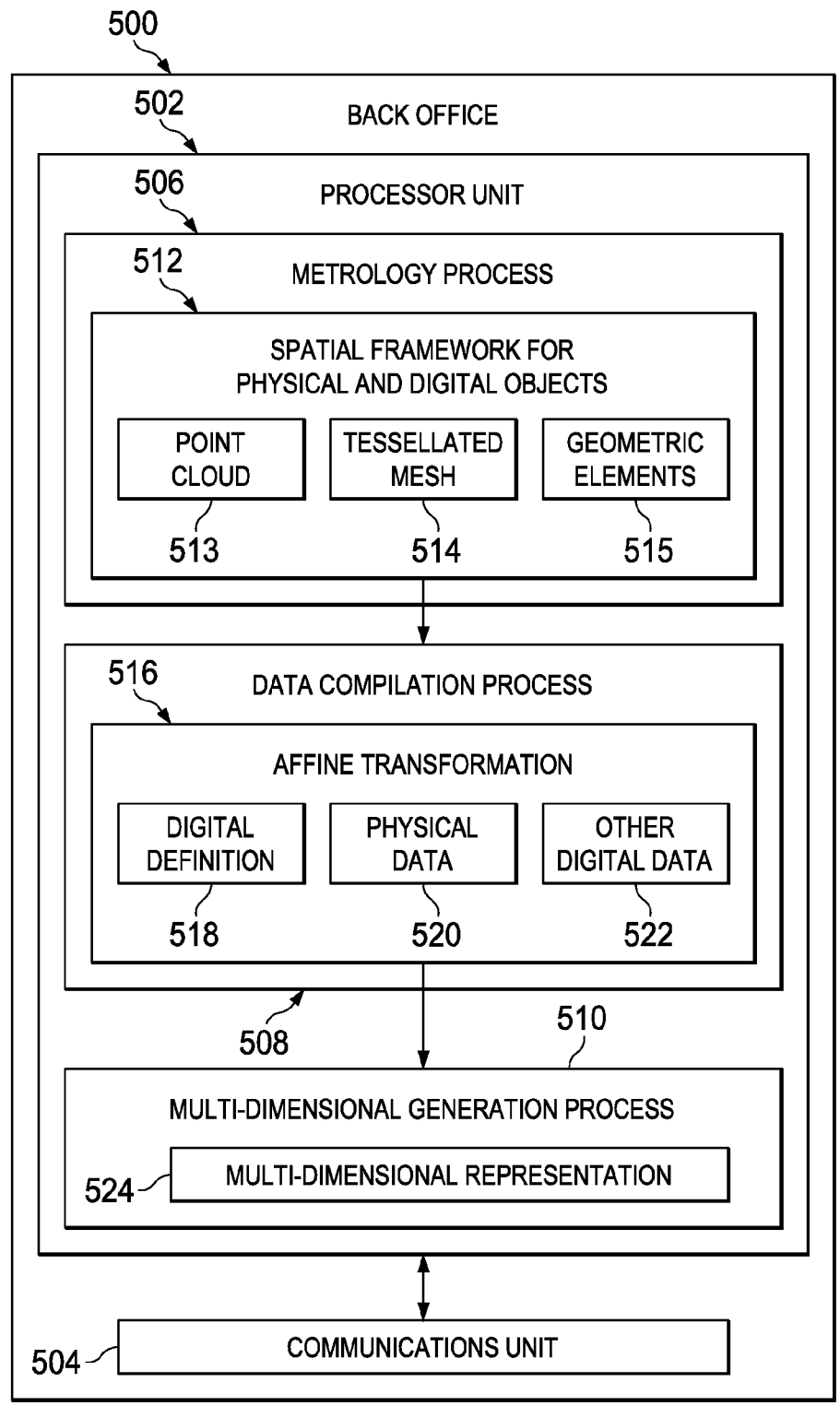
FIG. 5 is an illustration of a back office in accordance with an advantageous embodiment.

With reference now to FIG. 5, an illustration of a back office is depicted in accordance with an advantageous embodiment. Back office 500 is an illustrative example of one implementation of back office 306 in FIG. 3.

Back office 500 includes processor unit 502 and communications unit 504. Communications unit 504 is an illustrative example of one implementation of communications unit 210 in FIG. 2. Processor unit 502 includes metrology process 506, data compilation process 508, and multi-dimensional generation process 510. Metrology process 506, data compilation process 508, and multi-dimensional generation process 510 are software processes configured to be executed by a processing device, such as processor unit 502.

Metrology process 506 receives information about physical data, such as the distance to a number of physical objects 310 in FIG. 3, and uses the physical data to generate spatial framework for physical objects 512. Spatial framework for physical and digital objects 512 is one or more derived geometries that align with the digital definition of a physical object. Spatial framework for physical and digital objects 512 may be, for example, without limitation, represented as point cloud 513, tessellated mesh 514, and/or geometric elements 515. Point cloud 513 is a set of vertices in a three-dimensional coordinate system. These vertices are typically defined by X, Y and Z coordinates, and typically are intended to be representative of the external surface of an object, such as number of real world objects 310 in FIG. 3. Tessellated mesh 514 is similar to a point cloud, but further connects neighboring points in a cloud with a line or vector element. Then small planer faces, typically with three sides, are used to fill the spaces between the lines. Geometric elements 515 may be, for example, planes and surfaces.

Metrology process 506 sends spatial framework for physical objects 512 to data compilation process 508. Data compilation process 508 generates affine transformation 516 using the relative alignments of the spatial framework of physical and digital objects 512. The affine transformation derived by the relative positions of the axis systems is used to align a point cloud with a digital representation of the physical object. Alignment of a point cloud with a digital representation, or digital definition, may be accomplished through rotation and translation to achieve a point cloud substantially coincident with the digital definition. Substantially coincident refers to a result where a given subset of points from the point cloud are within a predetermined distance from the digital definition, or digital model. Data compilation process 508 determines the parameters to define substantially coincident. In other words, data compilation process 508 determines the percentage or percentage range of points that must match the digital definition, or digital model, in order for the definition of substantially coincident to be met.

Affine transformation 516 may be used to create an overlay of digital definition 518, physical data 520, and other digital data 522, in one illustrative example. In another illustrative example, affine transformation 516 is a mapping of digital definition 518 and other digital data 522 to physical data 520. For example, a digital image of an aircraft part may be overlaid with digital data pinpointing previous areas of damage and the resolution to those areas of damage, for example.

Other digital data 522 may be, for example, without limitation, text, graphics, icons, and other data that may be overlaid with physical data to augment the reality.

Multi-dimensional generation process 510 generates multi-dimensional representation 524 of digital and physical data combined in affine transformation 516. Multi-dimensional representation 524 is an augmented reality of physical environments and/or objects. Multi-dimensional representation 524 is transmitted to a number of portable devices, such as number of portable devices 304 in FIG. 3, using communications unit 504.

The illustration of back office 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
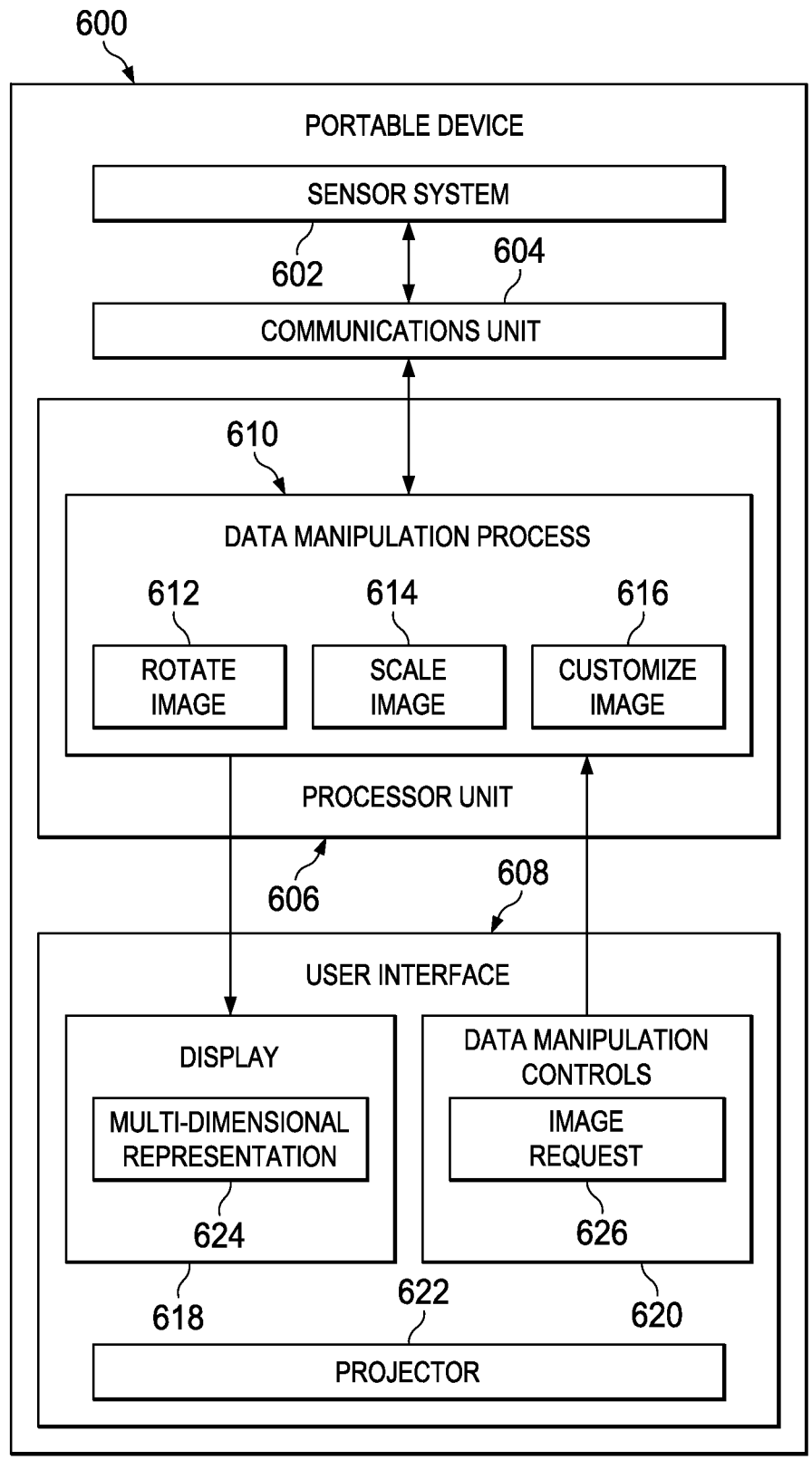
FIG. 6 is an illustration of a portable device in accordance with an advantageous embodiment.

With reference now to FIG. 6, an illustration of a portable device is depicted in accordance with an advantageous embodiment. Portable device 600 is an illustrative example of one implementation of number of portable devices 304 in FIG. 3.

Portable device 600 includes sensor system 602, communications unit 604, processor unit 606, and user interface 608. Sensor system 602 is an illustrative example of sensor system 314 in FIG. 3 and/or sensor system 400 in FIG. 4. Communications unit 604 is an illustrative example of one implementation of communications unit 210 in FIG. 2.

Processor unit 606 includes data manipulation process 610. Data manipulation process 610 is a software process configured to execute on a processing device, such as processor unit 606, for example. Data manipulation process 610 provides a user with options to manipulate multi-dimensional representations, or augmented realities, for different views over user interface 608. Data manipulation process 610 may include functions to manipulate multi-dimensional images, such as rotate image 612, scale image 614, and customize image 616, for example.

User interface 608 includes display 618, data manipulation controls 620, and projector 622. Display 618 is an illustrative example of one implementation of display 214 in FIG. 2. Data manipulation controls 620 may be presented on display 618 in one illustrative example. In another illustrative example, data manipulation controls 620 may be peripheral controls.

Multi-dimensional representation 624 may be viewed by a user using display 618. Multi-dimensional representation 624 may be manipulated for different viewing options using data manipulation controls 620 to activate data manipulation process 610. In an illustrative example, a user may input image request 626 to data manipulation controls 620. Image request 626 may be a request for a desired view to be streamed to portable device 600 from a back office, such as back office 306 in FIG. 3, for example.

The illustration of portable device 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
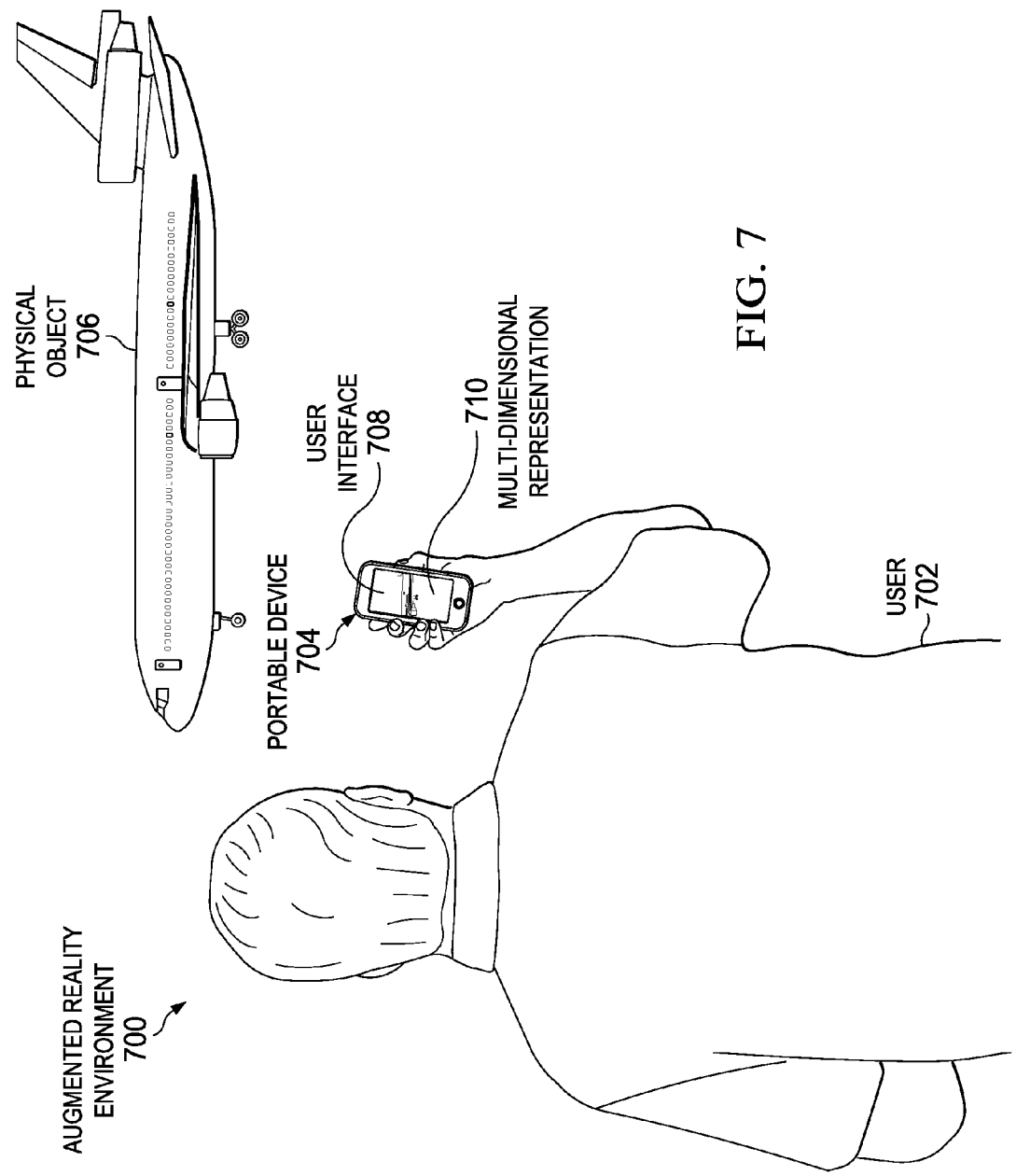
FIG. 7 is an illustration of an augmented reality environment in accordance with an advantageous embodiment.

With reference now to FIG. 7, an illustration of an augmented reality environment is depicted in accordance with an advantageous embodiment. Augmented reality environment 700 may be an illustrative example of an environment implementing portable augmented reality system 300 in FIG. 3, for example.

Augmented reality environment 700 depicts user 702 using portable device 704. Portable device 704 is an illustrative example of one implementation of portable device 304 in FIG. 3 and/or portable device 600 in FIG. 6. User 702 employs portable device 704 to capture data about physical object 706. In this illustrative example, physical object 706 may be an aircraft, parts of an aircraft, and/or specific locations or areas of an aircraft. In different illustrative example, physical object 706 may be any object in the real world. The data captured is sent from portable device 704 to a computing node, such as back office 306 in FIG. 3, for processing and reality augmentation.

User interface 708 is an illustrative example of a user interface associated with portable device 704. User interface 708 may be, for example, without limitation, software or a menuing system combined with a display, an interactive display, a touchscreen, and/or any other suitable user interface device. User interface 708 may receive data streamed back from the computing node, for example. In this illustrative example, multi-dimensional representation 710 displays over user interface 708 to augment the reality of physical object 706. In one illustrative example, multi-dimensional representation 710 may provide visual and digital data overlays of other physical objects located behind physical object 706 and beyond the real world view of user 702. In one example, parts located behind an opaque panel of an aircraft area being viewed by user 702 may be displayed in the augmented reality provided by multi-dimensional representation 710 over user interface 708.

The illustration of augmented reality environment 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
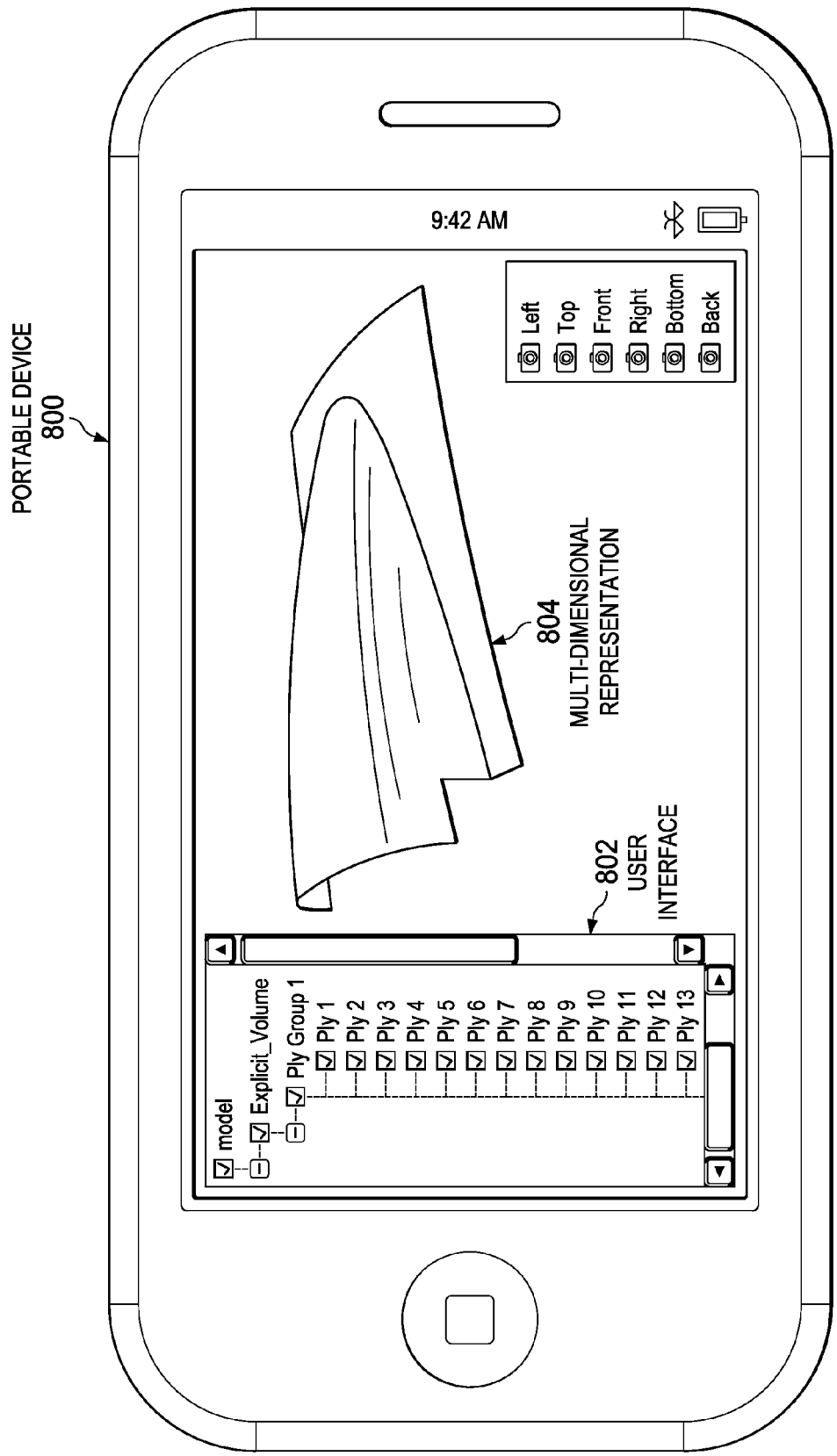
FIG. 8 is an illustration of a portable device in accordance with an advantageous embodiment.

With reference now to FIG. 8, an illustration of a portable device is depicted in accordance with an advantageous embodiment. Portable device 800 is an illustrative example of one implementation of portable device 305 in FIG. 3.

Portable device 800 includes user interface 802. User interface 802 may be an illustrative example of one implementation of user interface 318 in FIG. 3. User interface 802 may display multi-dimensional representation 804. Multi-dimensional representation 804 is an illustrative example of one implementation of multi-dimensional representation 328 generated by processor unit 322 and transmitted to portable device 305 over network 301 in FIG. 3.

The illustration of portable device 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
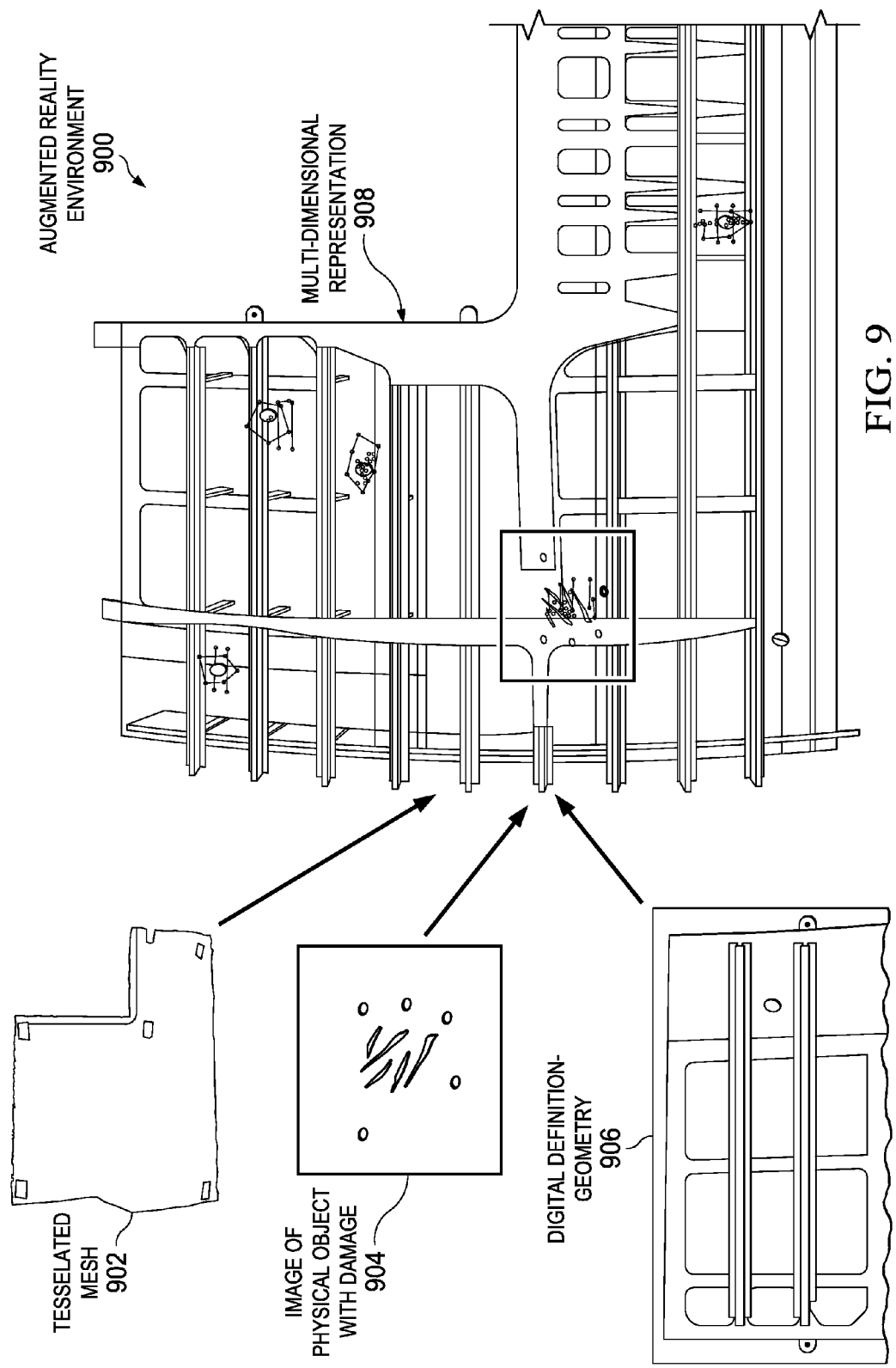
FIG. 9 is an illustration of an augmented reality environment in accordance with an advantageous embodiment.

With reference now to FIG. 9, an illustration of an augmented reality environment is depicted in accordance with an advantageous embodiment. Augmented reality environment 900 may be an illustrative example of an environment implementing portable augmented reality system 300 to generate multi-dimensional representation 328 in FIG. 3, for example.

Augmented reality environment 900 depicts tesselated mesh 902, image of physical object with damage 904, and digital definition-geometry 906 integrated or overlaid to view as multi-dimensional representation 908. Multi-dimensional representation 908 is an augmented reality of an aircraft part, in this illustrative example. Multi-dimensional representation 908 provides a user with digital data overlays of damage areas for the part, depicted by image of physical object with damage 904, over a user interface, such as user interface 802 in FIG. 8, for example.

The illustration of augmented reality environment 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, a select area of a digital display of a physical object may be selected to view components behind the physical object being viewed, or components required to be added to the physical object being viewed.

Figure 10:
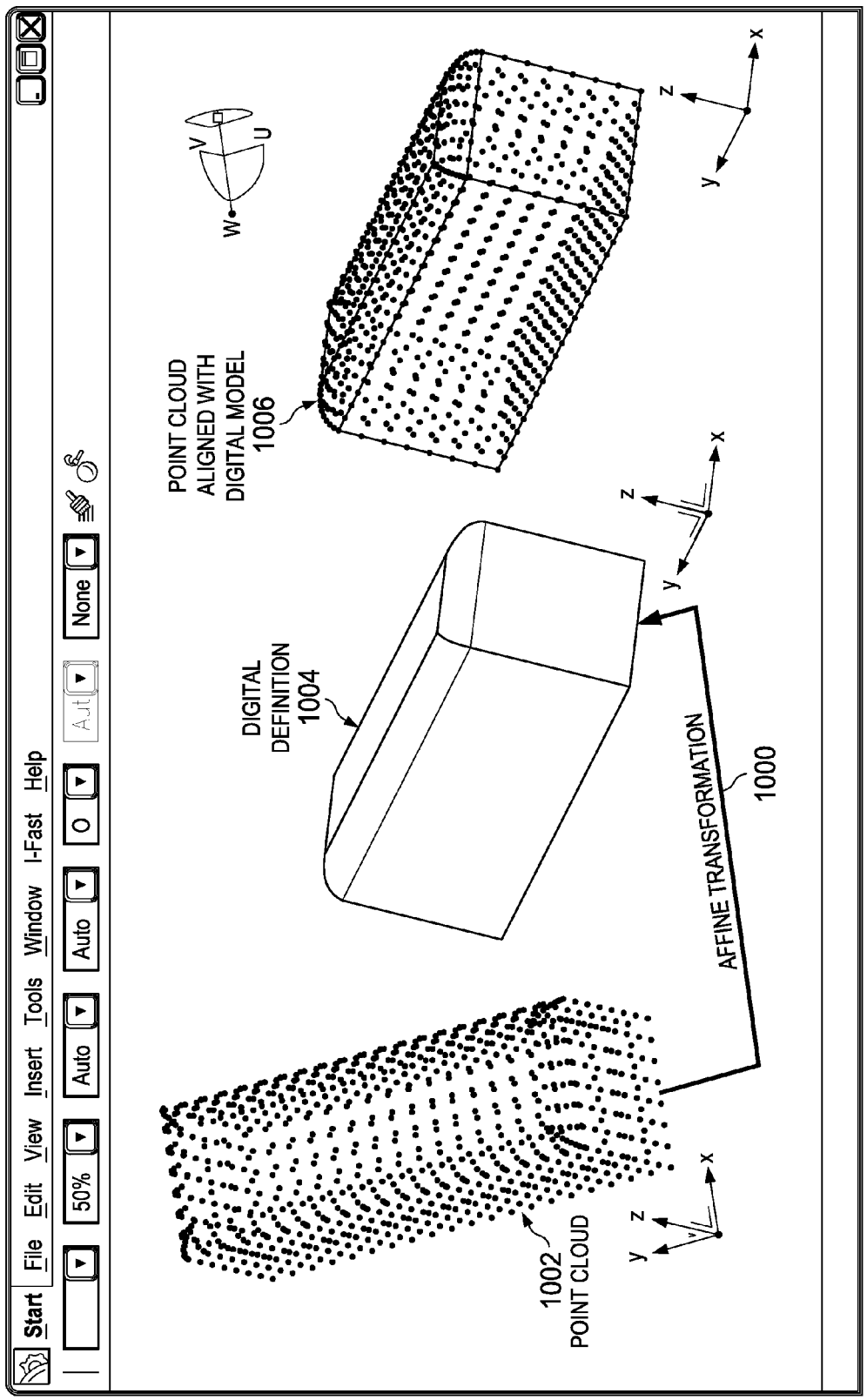
FIG. 10 is an illustration of how a transformation matrix is derived and applied in accordance with an advantageous embodiment.

With reference now to FIG. 10, an illustration of how a transformation matrix is derived and applied is depicted in accordance with an advantageous embodiment. The derivation and application of affine transformation 1000 may be an illustrative example of one implementation of utilizing affine transformation 326 in FIG. 3.

An affine transformation may be a mathematical 4×4 matrix that defines the spatial relationship between information captured about the relative orientation of a physical object and the digital definition for that physical object, in one illustrative example. In this example, point cloud 1002 and its axis system represents the information captured about the physical object, which needs to align with digital definition 1004 and its axis system to result in point cloud aligned with digital model 1006. The data needed to derive and apply an affine transformation is illustrated by affine transformation 1000.

Figure 11:
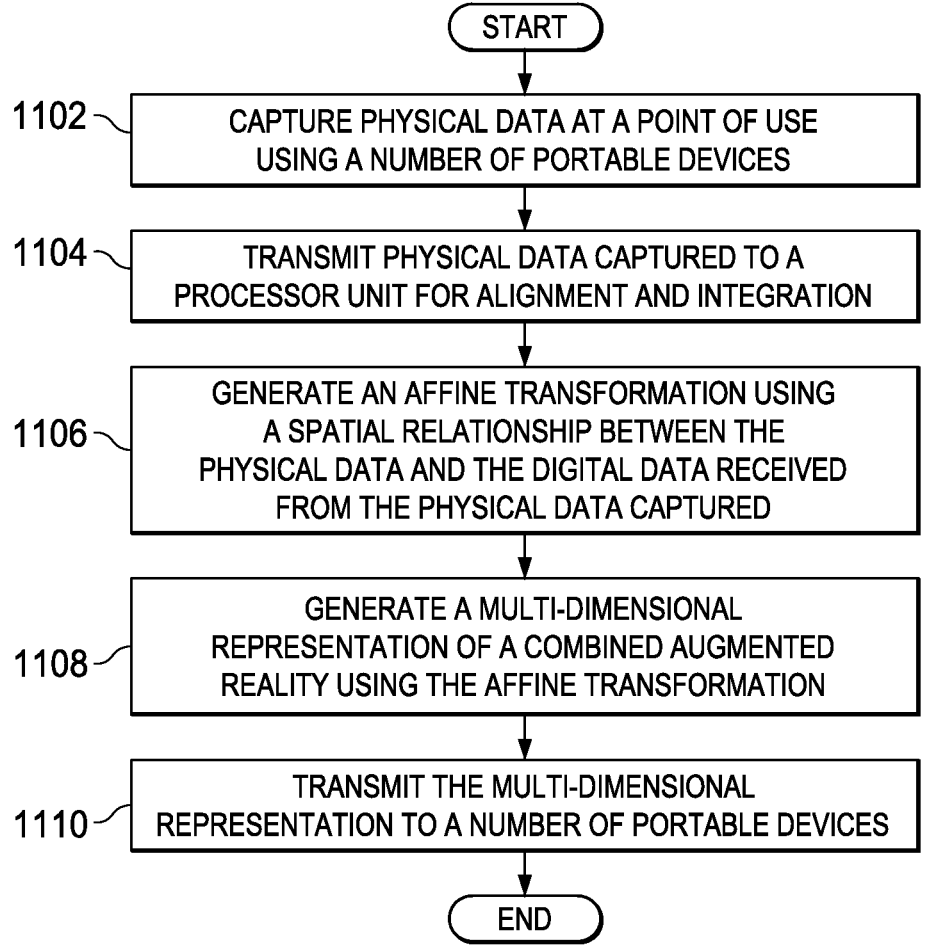
FIG. 11 is an illustration of a flowchart for a process of augmenting reality in accordance with an advantageous embodiment.

With reference now to FIG. 11, an illustration of a flowchart for a process of augmenting reality is depicted in accordance with an advantageous embodiment. The process in FIG. 11 may be implemented by a component such as portable augmented reality system 300 in FIG. 3 using portable device 304 and back office 306, for example.

The process begins by capturing physical data at a point of use using a number of portable devices (operation 1102). The physical data may be information about real world objects, such as number of physical objects 310 in FIG. 3. The process transmits the physical data captured to a processor unit for alignment and integration (operation 1104). The data gathered from the physical objects may generate a cloud of points, for example. Alignment software may be used to determine the affine transformation required to align the physical data with the digital data, in this example. The process generates an affine transformation using a spatial relationship between the physical data and the digital data received from the data transmittal process in operation 1104 (operation 1106). The affine transformation can be used to move images of the physical object into the proper orientation in digital space, for example, by rotation and translation of the point cloud to be substantially coincident with a digital model or digital definition. The process generates a multi-dimensional representation of a combined augmented reality using the affine transformation (operation 1108). The process then transmits the multi-dimensional representation to a number of portable devices (operation 1110), with the process terminating thereafter.

The multi-dimensional representation may be stored for later use to register additional physical information to the multi-dimensional model, for example. The representation may also be retrieved from storage at a later time for review, persisting after generation for later use.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current computing environments include software modules that are not integrated in such a way as to overlap digital data with physical data and handheld devices that are not powerful enough to generate the environment required for the point of use augmented reality experience desired. Upfront preparation, limited portability, high costs, and set-up delays plague current capabilities and prevent a cost-effective, accessible and ad-hoc implementation of a persistent augmented reality.

Thus, the different advantageous embodiments provide a system and tool that provides the ability to see a combined view of the actual object with accurate historical data laid directly over the object. A mechanic, for example, will be able to accurately identify any prior repair work done, hidden structures, or other objects that may reside in the same area, while avoiding damage to the part or structure when doing a repair. Other critical information provided also helps assure that a quality repair job is done quickly, efficiently, and without error. This is especially useful when dealing with aircraft as the expense of having an Aircraft On Ground (AOG) condition is expensive to the business.

The different advantageous embodiments further provide a system with the capability to view relevant records, test results, and other information useful for diagnosis. For example, in a medical application, relevant records may be patient records, x-rays, test results, and the like. These records may be used as an overlay to the actual body of the patient, which would streamline the diagnosis of ailments, and help assure increased accuracy in diagnosis and higher quality patient treatment.

The different advantageous embodiments further provide a system and method that enables efficient adherence to regulations and code during production and planning processes. In an illustrative example of a construction environment, the system may enable inspectors, foremen, and construction crews to see relevant building specifications, codes, schematics for wiring, duct work, and the like. This information may be provided before, during, and after construction, via a layered approach and based on actual versus planned location, which would enable the workers to very quickly and easily compare the build process and structures with governing codes and planning, assuring quality and cost efficiency.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for providing an augmented reality view of an object comprising:
   a processor unit configured to execute a data manipulation process;
   a sensor system configured to retrieve physical data about a physical object, the sensor system comprising a number of imaging devices configured to obtain physical data for the physical object, the physical data including an image of a surface of the physical object, the sensor system further including a positioning system, a clock, and an accelerometer;
   a handheld device, the sensor system associated with the handheld device, and the processor unit positioned remotely from the handheld device, the handheld device configured to transmit the physical data to the processor unit; and a user interface associated with the handheld device having data manipulation controls for the data manipulation process;

wherein the processor unit is configured to generate a number of digital definitions in a metrology process using the physical data, the number of digital definitions including one or more derived geometries of sufficient quality to align with a digital definition of the object, generate an affine transformation in a data compilation process using a spatial relationship between the physical data and digital data associated with the object in the processor unit, wherein the affine transformation includes a translation and a rotation of a point cloud to be substantially coincident with a digital definition, and generate in a multi-dimensional generation process in the processor unit a multi-dimensional representation of a combined augmented reality of the object using the affine transformation, the multi-dimensional representation comprising physical data for the physical object including the image of the surface of the object and digital data for the physical object including a first overlay representing components associated with the object and positioned below the surface and a second overlay indicating a repaired area of the object, the processor unit further configured to transmit the multi-dimensional representation to the handheld device;

wherein the object comprises a composite structure having a number of plies positioned under a surface of the composite structure and further comprising selecting a ply, via the user interface, in the number of plies to display in the multi-dimensional representation, and displaying the ply and a repair to the ply as a result of the selection.

2. The apparatus of claim 1, wherein the sensor system further includes a compass.

3. The apparatus of claim 1, wherein the data manipulation controls provide rotation and scaling of a multi-dimensional representation displayed on the user interface.

4. The apparatus of claim 1 further comprising a communications unit, the communications unit configured to receive the multidimensional representation.

5. An apparatus for providing an augmented reality view of an aircraft comprising:
a number of portable devices, wherein the number of portable devices is configured to obtain physical data for an object using a sensor system associated with the number of portable devices, the object comprising an aircraft having a composite structure, transmit the physical data, and receive a multi-dimensional representation, the sensor system further including a number of imaging systems to obtain the physical data, a positioning system, a clock, and an accelerometer; and
a computer system remote from the number of portable devices configured to receive the physical data generated by the number of portable devices, generate a number of digital definitions in a metrology process using the physical data, the number of digital definitions including one or more derived geometries of sufficient quality to align with a digital definition of the object, generate an affine transformation in a data compilation process using a spatial relationship between the physical data and digital data associated with the object in the processor unit, wherein the affine transformation includes a translation and a rotation of a point cloud to be substantially coincident with a digital definition, and generate in a multi-dimensional generation process in the processor unit a multi-dimensional representation of a combined augmented reality of the object using the affine transformation, and transmit the multi-dimensional representation to the number of portable devices for display, the multi-dimensional representation comprising the physical data and the digital data for the object, wherein the physical data includes an image of a surface of the composite structure and the digital data comprises a first overlay showing a repair to the composite structure below the surface of the composite structure and a second overlay showing a digital definition geometry of a structure below the surface of the composite structure;

wherein the number of portable devices include at least one user interface, and wherein the multi-dimensional representation is viewed by a user on the user interface;

wherein the composite structure has a number of plies positioned under a surface of the composite structure and further comprising selecting a ply, via the user interface, in the number of plies to display in the multi-dimensional representation, and displaying the ply and a repair to the ply as a result of the selection.

6. The apparatus of claim 5 further comprising:
a number of storage devices in the number of portable devices, the number of storage devices configured to store a number of multi-dimensional representations sent to the number of portable devices by the computer system.

7. The apparatus of claim 5 further comprising a metrology system in the computer system, the metrology system configured to generate a spatial framework for the object.

8. The apparatus of claim 7, wherein the spatial framework comprises a tessellated mesh.

9. The apparatus of claim 5 wherein the repair includes a time stamp.

10. A method for augmenting reality, the method comprising:
capturing physical data for an object at a point of use using a number of portable devices; transmitting the physical data captured by the number of portable devices to a processor unit remote from the number of portable devices for alignment and integration;
generating a number of digital definitions in a metrology process in the processor unit using the physical data, the number of digital definitions including one or more derived geometries of sufficient quality to align with a digital definition of the object;
generating an affine transformation in a data compilation process in the processor unit using a spatial relationship between the physical data and digital data associated with the object in the processor unit, wherein the affine transformation includes a translation and a rotation of a point cloud to be substantially coincident with a digital definition;
generating in a multi-dimensional generation process in the processor unit a multi-dimensional representation of a combined augmented reality of the object using the affine transformation;
transmitting the multi-dimensional representation to the number of portable devices; and displaying in the number of portable devices the multi-dimensional representation comprising physical data related to the object and digital data related to the object, the physical data comprising an image of a surface of the object and the digital data comprising a first overlay of damage areas beyond the surface of the object and a second overlay of a digital definition geometry of a structure beyond the surface of the object;

wherein the number of portable devices include at least one user interface, and wherein the multi-dimensional representation is viewed by a user on the user interface;

wherein the object comprises a composite structure having a number of plies positioned under a surface of the composite structure and further comprising selecting a ply, via the user interface, in the number of plies to display in the multi-dimensional representation, and displaying the ply and a repair to the ply as a result of the selection.

11. The method of claim 10, wherein the multi-dimensional representation is augmented reality.

12. The method of claim 10, wherein the affine transformation includes a rigid motion.

13. The method of claim 10 further comprising:
storing the multi-dimensional representation on the number of portable devices; and
retrieving the multi-dimensional representation stored on the number of portable devices.

14. The method of claim 10 further comprising displaying maintenance information related to the object in the multi-dimensional representation, the maintenance information comprising a plurality of time stamped repair data.

15. The method of claim 10, wherein the object comprises a composite material, and further comprising displaying overlays of repairs associated with the damage areas for the object in the multi-dimensional representation.

* * * * *